3,472,818
Patented Oct. 14, 1969

3,472,818
LINEAR POLYCARBONAMIDES FROM BIS(4-CARBOXYCYCLOHEXYL)METHANE
Frederick T. Wallenberger, Wilmington, Del., assignor to E. I. du Pont de Nemours and Company, Wilmington, Del., a corporation of Delaware
No Drawing. Filed Feb. 23, 1967, Ser. No. 617,851
Int. Cl. C08g 20/20
U.S. Cl. 260—78
5 Claims

---

ABSTRACT OF THE DISCLOSURE

A class of fiber-forming polycarbonamides (including copolycarbonamides) typified by a polymer of the recurring unit:

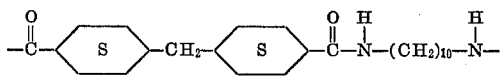

Filaments of these polymers have high resilience and good recovery properties.

---

BACKGROUND OF THE INVENTION

Field of the invention

The inventon relates to a novel and useful linear polyamide of fiber-forming molecular weight, especially suitable for melt-spinning to fibers.

STATEMENT OF THE INVENTION

In accordance with the present invention a linear, fiber-forming polycarbonamide wherein recurring carbonamide linkages are an integral part of the polymer chain is provided wherein at least 70% by weight of the repeating units of the said polycarbonamide are of the formula:

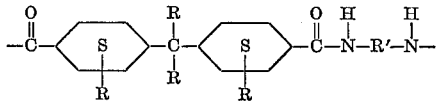

wherein R is the same or different member of the class consisting of hydrogen and methyl, R' is an organic alkylene radical containing from 6 to 16 carbon atoms, any copolymeric unit when present being a divalent organic radical containing from about 4 to about 20 carbon atoms, the said divalent radical being joined into the linear polymer chain as an integral part thereof by radicals from the class consisting of amino and carbonyl. By "divalent organic radical" is meant divalent radicals, bonded to the amino or carbonyl radicals through carbon, which radicals are predominantly hydrocarbon, but which (1) may be chain-interrupted by hetero atoms such as oxygen or sulfur, and/or (2) may have substituents for hydrogen which include radicals such as sulfonate, sulfate, phosphate, phosphinate, hydroxyl, acyl, and the like.

The polymers of this invention can be prepared most conveniently and economically by polymerization of the corresponding diammonium salt formed between the acid and the diamine by heating at temperatures above about 250° C. and preferably 280° C. either in molten or solid form under conditions which permit removal of the water released by the condensation reaction.

The bis(4-carboxycyclohexyl)methane starting material exists in three stereoisomeric forms, cis-cis, cis-trans, and trans-trans. Heating, particularly under acidic conditions, can result in isomerization of the acid to give a higher concentration of the more thermally stable trans-trans configuration. For this reason it is difficult to analyze the actual isomer composition in the polymer since attempts to isolate the acid from the polymer (for example, by hydrolysis) can itself result in changing the isomer content. Because of this, polymers prepared at high temperature from acid initially containing high concentrations of the less stable cis-cis form, are believed to contain less of the cis-cis isomer and more of the trans-trans isomer than was present in the initial acid. Consequently, the isomer composition of the acid prior to polymerization is of little significance, since the isomer composition will seek equilibration under the polymerization conditions used. This is contrary to the situation with the reverse polymers of bis(4-aminocyclohexyl)methane and aliphatic diacids wherein the diamine does not itself readily isomerize upon heating alone. For the latter, when a polymer of a higher trans-trans content is desired, a higher trans-trans starting diamine must be used. Since the preferred polymers normally are those containing higher amounts of the trans-trans isomer, this ability of the polymers of this invention to isomerize during polymerization is highly desirable.

Suitable diamines for preparation of these polymers are, for example, linear aliphatic diamines such as hexamethylene, decamethylene, dodecamethylene diamines, etc., containing 6 to 16 carbon atoms.

DEFINITIONS, STANDARDS AND TEST PROCEDURES

The following examples, in which percentages are by weight unless otherwise indicated, are intended to illustrate the invention. They are not intended to limit it in any way.

By "fiber-forming" is meant that the product of this invention is capable of being formed into useful filaments and fibers by conventional fiber spinning processes. Normally a sufficiently high molecular weight to reach the "fiber-forming" stage is obtained when the polymer has an inherent viscosity of at least about 0.4. Inherent viscosity as used herein is determined in the conventional manner on a solution containing 0.5 gram of polymer in 100 milliliters of m-cresol, unless otherwise specified.

The Tensile Strain Recovery (TSR) measurement reported in the examples is obtained as described in U.S. 3,249,591, column 4, lines 43–66. In general, a TSR value of 40% or greater is considered to provide acceptable wash-wear performance in fabrics. Work Recovery (WR) is the ratio in percent of the work done by the filament in recovering from the percent stretch specified to the work done in stretching the filament. Tensile Form Recovery (TFR) is the percent linear recovery which occurs upon relaxation following the percent stretch specified. The Wash Set Recovery Angle (WSRA) test is also described in U.S. 3,249,591, column 4, line 67 through column 5, line 7.

EXAMPLES

Example 1.—(Preparation of 12–CCM polyamide)

The diammonium salt is prepared from dodecamethylene diamine (i.e., the 12 diamine) and bis(4-carboxycyclohexyl)methane (i.e., CCM) by precipitation from solution of the reactants in isopropyl alcohol. The acid has a neutralization equivalent of 134.0 and analysis of the dimethyl ester of the acid by vapor phase chromotography shows that it is a mixture of stereoisomers in the following proportions: 13.5% trans-trans, 36.5% cis-trans and 50 cis-cis. The salt is polymerized in a sealed tube by heating at 230° C. for 1.5 hours and then by heating at 305° C. under sweeping dry nitrogen at atmospheric pressure for two hours. The melting point of the polymer by Differential Thermal Analysis (DTA) is 239° C.

The polymer is spun into filaments using a press spinner at 280° C. and the filaments drawn 3.6× using a 95° C.

hot pin. The 5-filament yarn denier is 66. Filament properties after a scour in boiling water are shown in Table I.

TABLE I

| | |
|---|---|
| Ten./Elong./Mod. | 1.5/10/27 |
| WR 3%/5% | 86/67 |
| TSR | 56 |
| TFR 3%/5% | 93/87 |
| WSRA | 255 |
| BOS | 11.1% |

A sample of the polymer is hydrolyzed under pressure with hydrochloric acid at 140° C. The resulting bis(4-carboxycyclohexyl)methane upon analysis was found to have a trans-trans isomer content of 59%, 34% cis-trans and 7% cis-cis. However, the starting acid when subjected to the same hydrolytic conditions underwent isomerization of 66% trans-trans, 31% cis-trans and 3% cis-cis isomers. The spun filaments are also drawn 4.0× using a hot pin at 90° C. and a heated plate at 120° C., filament properties after a boil-off treatment followed by heat setting at 140° C. and at 160° C. for two minutes under a tension of 4.0 mg./den. are shown in Table II.

TABLE II

| | Heat set 140° C., 2 min. | Heat set 160° C., 2 min. |
|---|---|---|
| Ten./Elong./Mod.: | | |
| Dry | 2/18/33 | 1.6/17/27 |
| 40° C. Wet | 2/20/24 | 1.5/23/21 |
| WR 3%/5%: | | |
| Dry | 75/56 | 76/48 |
| 40° C. Wet | 55/47 | 57/40 |
| TFR 3%/5%: | | |
| Dry | 90/80 | 90/74 |
| 40° C. Wet | 78/75 | 82/70 |
| TSR 3% | 61 | 55 |
| WSRA | 248 | |

Example 2.—(Preparation of 6-CCM polyamide)

The diammonium salt is prepared from hexamethylene diamine and bis(4-carboxycyclohexyl)methane which is substantially 100% of the trans-trans isomer. The salt is polymerized in a sealed tube at 280° C. for two hours followed by heating for two hours at 325° C. under sweeping dry nitrogen at atmospheric pressure. The polymer has an inherent viscosity of 0.93 and a melting point (DTA) of 278° C. Filaments are dry spun from solution in formic acid, using a spinneret temperature of 78–80° C., into a nitrogen chamber with incoming nitrogen at 165–170° C. followed by a heated column at 156–162° C. The filaments are drawn by hand approximately 3.5× at a temperature of 135–140° C. Filament properties after being scoured in boiling water and heat set (160° C., 2 min.) are shown in Table III.

TABLE III

| | Scoured [1] | Heat set [1] |
|---|---|---|
| Ten./Elong./Mod. | 1.8/89/22 | 1.5/96/25 |
| WR 3%/5% (Dry) | 61/49 | 55/37 |
| TER 3%/5% (Dry) | 81/76 | 84/70 |

[1] Under 4 mg./den. tension.

Example 3.—(Preparation of 10-CCM polyamide)

The diammonium salt is prepared from decamethylene diamine and bis(4-carboxycyclohexyl)methane containing about 14% of the trans-trans isomer and polymerized by heating in a sealed tube at 260° C. for two hours followed by heating under flowing nitrogen at 305° C.

for two hours. The polymer has an inherent viscosity of 1.05 and a melting point (DTA) of 252° C. The polymer is melt spun into filaments using a press spinner at 280° C. and drawn 4.0× using a hot pin at 90° C. and a heated plate at 180° C. Filament properties after scouring and heat setting at 160° C. for 2 minutes are shown in Table IV.

TABLE IV

| | Scoured [1] | Heat set [1] |
|---|---|---|
| Ten./Elong./Mod. | 3.1/32.5/41.7 | 2.2/19.5/26.7 |
| WR 3%/5% Dry | 65/51 | 68/48 |
| TFR 3%/5% Dry | 89/80 | 88/75 |
| TSR | 45 | 39 |
| BOS, percent [2] | 6 | |

[1] Under 4.0 mg./den. tension.
[2] Boil-off shrinkage.

The polymers of this invention are useful in molding, and extruded articles as well as filaments and fibers in textiles, knitted, woven and nonwoven fabric applications and other well-known uses for synthetic polymers. The polymer may be used as a homopolymer, or blended or co-spun with other polymers by procedures well known in the art. The polymer may contain conventional additives such as stabilizers, antioxidants, delusterants, pigments, dyes, antistatic agents and the like. The polymer may also contain copolymeric units within the main polymer chain, with said units preferably comprising no more than about 15 mol percent of said polymer.

Many equivalent modifications of the present invention will become apparent to those skilled in the art from a reading of the above without a departure from the inventive concept.

What is claimed is:

1. A linear fiber-forming polycarbonamide wherein recurring carbonamide linkages are an integral part of the polymer chain and which consists essentially of the following repeating units:

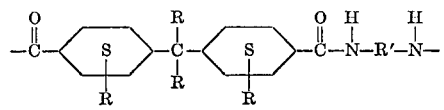

wherein R is a member of the class consisting of hydrogen and methyl and R' is an organic alkylene radical containing from 6 to 16 carbon atoms.

2. The polycarbonamide of claim 1 wherein R is hydrogen.

3. The polycarbonamide of claim 2 wherein R' is decamethylene.

4. The polycarbonamide of claim 2 wherein R' is dodecamethylene.

5. The polycarbonamide of claim 2 wherein R' is hexamethylene.

References Cited

UNITED STATES PATENTS

| | | | |
|---|---|---|---|
| 2,130,948 | 9/1938 | Carothers | 260—78 |
| 2,913,433 | 11/1959 | Wittbecker | 260—78 |
| 2,937,162 | 5/1960 | Martin et al. | 260—78 |
| 2,939,862 | 6/1960 | Caldwell et al. | 260—78 |
| 2,965,616 | 12/1960 | Caldwell et al. | 260—78 |

HAROLD D. ANDERSON, Primary Examiner

U.S. Cl. X.R.

260—857